US012615602B2

(12) United States Patent (10) Patent No.: US 12,615,602 B2
Smith et al. (45) Date of Patent: Apr. 28, 2026

(54) MULTI-ACCESS POINT COORDINATION FOR NON-SIMULTANEOUS TRANSMIT AND RECEIVE CROSS-BAND PHYSICAL LAYER PROTOCOL DATA UNIT ALIGNMENT

(71) Applicant: Cisco Technology, Inc., San Jose, CA (US)

(72) Inventors: Malcolm M. Smith, Richardson, TX (US); Indermeet S. Gandhi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 307 days.

(21) Appl. No.: 18/467,903

(22) Filed: Sep. 15, 2023

(65) Prior Publication Data

US 2024/0381271 A1 Nov. 14, 2024

Related U.S. Application Data

(60) Provisional application No. 63/501,763, filed on May 12, 2023.

(51) Int. Cl.
*G06F 15/16* (2006.01)
*H04W 48/12* (2009.01)
*H04W 56/00* (2009.01)

(52) U.S. Cl.
CPC ......... *H04W 56/001* (2013.01); *H04W 48/12* (2013.01)

(58) Field of Classification Search
CPC ............................ H04W 56/001; H04W 48/12
See application file for complete search history.

(56) References Cited

U.S. PATENT DOCUMENTS

| 2017/0142728 | A1* | 5/2017 | Tsai .................. | H04W 72/0453 |
|---|---|---|---|---|
| 2022/0303907 | A1 | 9/2022 | Shafin et al. | |
| 2022/0312506 | A1 | 9/2022 | Xia et al. | |
| 2022/0394487 | A1 | 12/2022 | Cizdziel et al. | |
| 2023/0023779 | A1 | 1/2023 | Shafin et al. | |
| 2023/0054755 | A1 | 2/2023 | Patil et al. | |
| 2024/0155360 | A1* | 5/2024 | Aio ....................... | H04W 16/28 |

FOREIGN PATENT DOCUMENTS

WO          2022108838 A1     5/2022

OTHER PUBLICATIONS

International Search Report and Written Opinion for International Application No. PCT/US2024/028660, mailed Aug. 21, 2024, 15 Pages.

* cited by examiner

*Primary Examiner* — John B Walsh
(74) *Attorney, Agent, or Firm* — Merchant & Gould P.C.

(57) ABSTRACT

Access Point (AP) coordination and, specifically, Multi-AP Coordination (MAPC) for Non-Simultaneous Transmit and Receive (NSTR) cross-band Physical Layer Protocol Data Unit (PPDU) alignment may be provided. The coordination can include determining to communicate with a client using MAPC Multi-Link-Device (MLD) operation. A first AP operating on a first band with a first link to the client and a second AP operating on second band with a second link to the client may be determined to communicate with the client. The first AP and the second AP may be coordinated to send one or more PPDUs with synchronized end times. The first AP may be instructed to transmit to the client via the first link and the second AP may be instructed to transmit to the client via the second link according to the coordination.

17 Claims, 2 Drawing Sheets

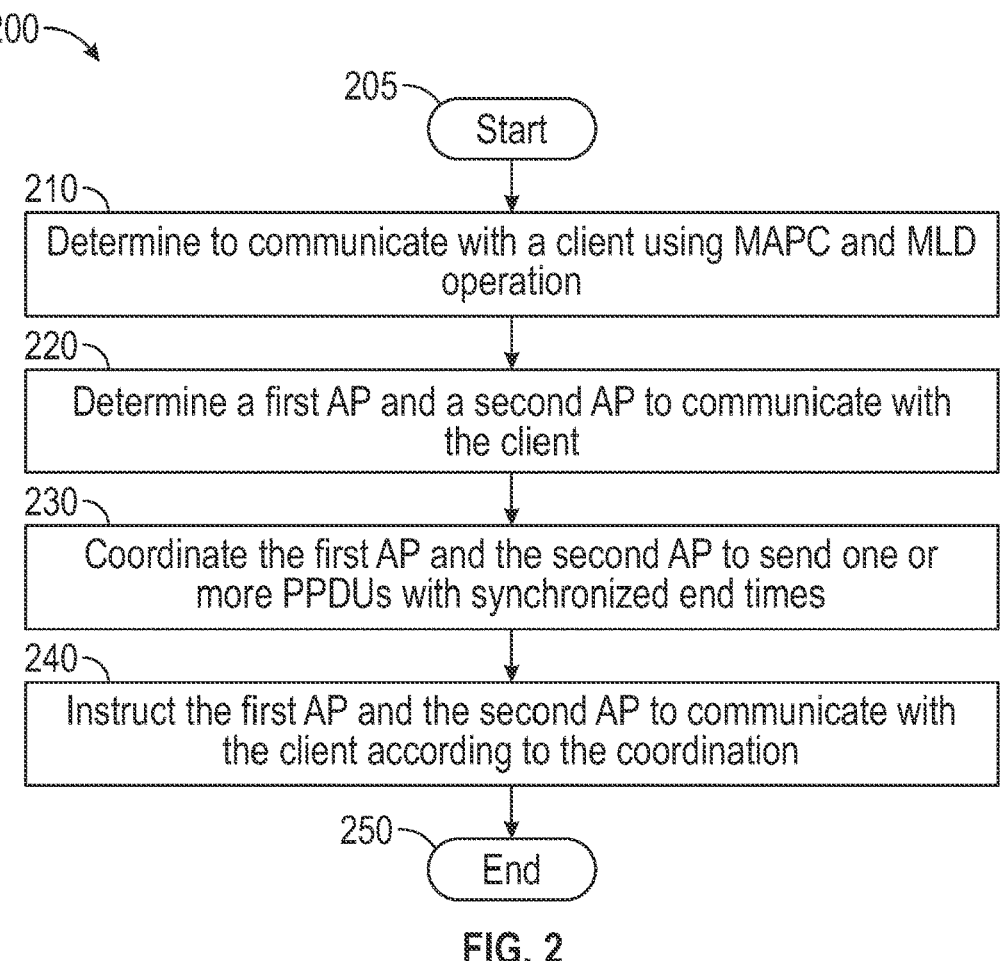

200

205 — Start

210 — Determine to communicate with a client using MAPC and MLD operation

220 — Determine a first AP and a second AP to communicate with the client

230 — Coordinate the first AP and the second AP to send one or more PPDUs with synchronized end times 240 — Instruct the first AP and the second AP to communicate with the client according to the coordination 250 — End

FIG. 2

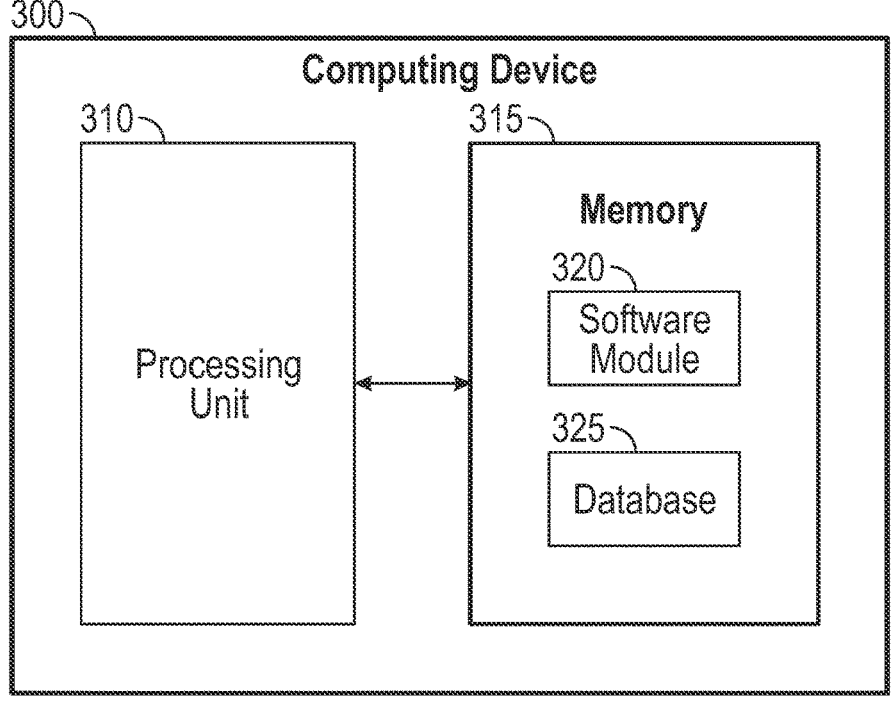

300

Computing Device

310 — Processing Unit

315 — Memory

320 — Software Module

325 — Database

MULTI-ACCESS POINT COORDINATION FOR NON-SIMULTANEOUS TRANSMIT AND RECEIVE CROSS-BAND PHYSICAL LAYER PROTOCOL DATA UNIT ALIGNMENT

RELATED APPLICATION

Under provisions of 35 U.S.C. § 119 (e), Applicant claims the benefit of U.S. Provisional Application No. 63/501,763 filed May 12, 2023, which is incorporated herein by reference.

TECHNICAL FIELD

The present disclosure relates generally to providing Access Point (AP) coordination and specifically to providing Multi-AP Coordination (MAPC) for Non-Simultaneous Transmit and Receive (NSTR) cross-band Physical Layer Protocol Data Unit (PPDU) alignment.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings:

FIG. 2 is a flow chart of a method for MAPC and MLD operation; and

FIG. 3 is a block diagram of a computing device.

DETAILED DESCRIPTION

Overview

Figure 1:
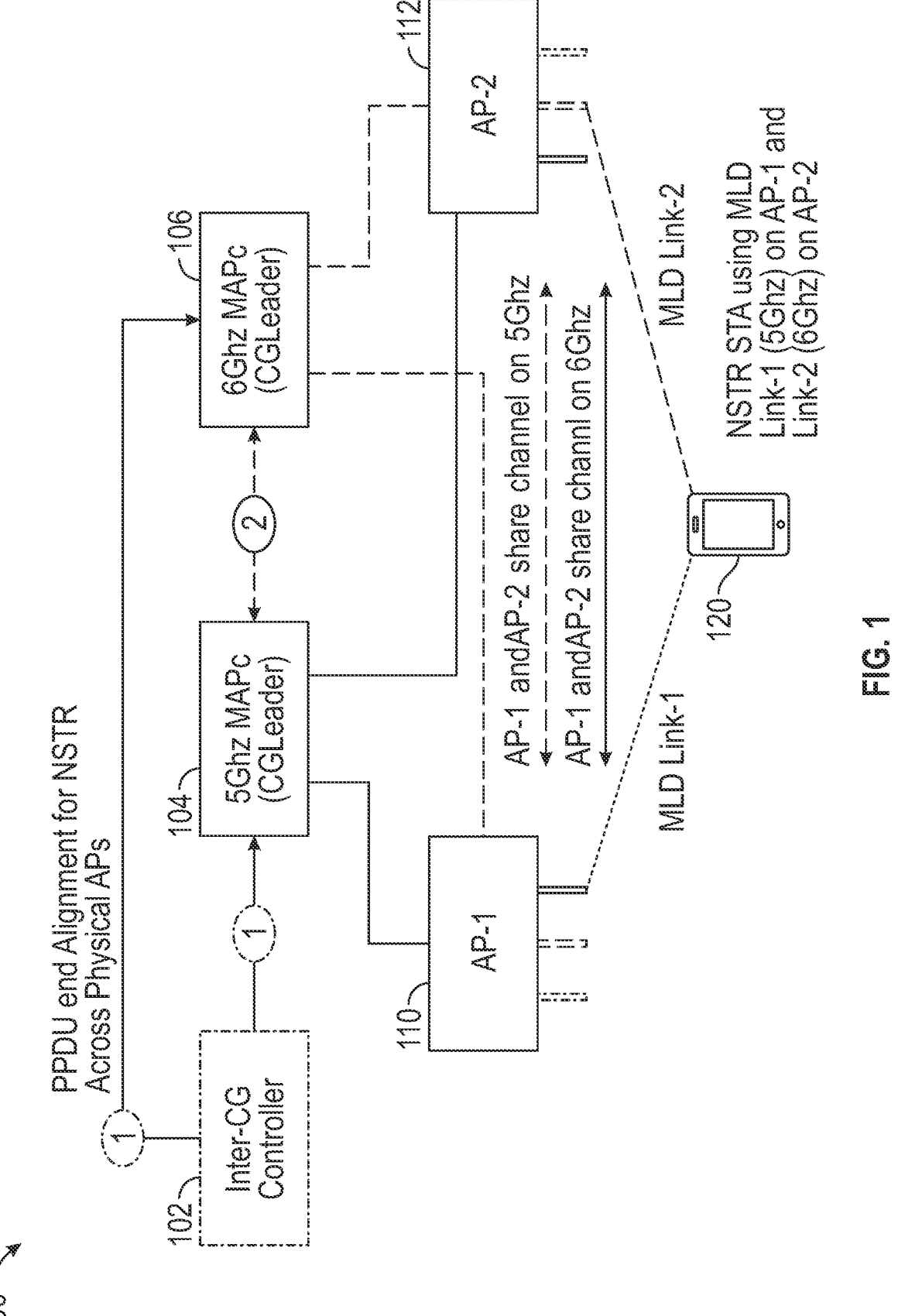
FIG. 1 is a block diagram of an operating environment for Multi-Access Point Coordination (MAPC) and Multi-Link-Device (MLD) operation.

Access Point (AP) coordination and, specifically, Multi-AP Coordination (MAPC) for Non-Simultaneous Transmit and Receive (NSTR) cross-band Physical Layer Protocol Data Unit (PPDU) alignment may be provided. The coordination can include determining to communicate with a client using MAPC Multi-Link-Device (MLD) operation. A first AP operating on a first band with a first link to the client and a second AP operating on second band with a second link to the client may be determined to communicate with the client. The first AP and the second AP may be coordinated to send one or more PPDUs with synchronized end times. The first AP may be instructed to transmit to the client via the first link and the second AP may be instructed to transmit to the client via the second link according to the coordination.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In the Institute of Electrical and Electronics Engineers (IEEE) 802.11be (Wi-Fi 7) and 802.11bn (Wi-Fi 8) standards, Multi-Access Point Coordination (MAPC) and Multi-Link-Device (MLD) operation are presented as separate capabilities. MAPC uses Over-The-Air (OTA) signaling to coordinate transmissions between multiple APs, while MLD uses distinct links from the AP and individual Stations (STAs) to improve throughput and latency. While MAPC and MLD operations can be used independently, there may be significant advantages when using MAPC and MLD operations together. For example, by coordinating MAPC and MLD, it may be possible to achieve higher throughput and lower latency than with either capability alone.

One challenge that arises when using MAPC and MLD together is coordinating the start and/or end alignment of Physical Layer Protocol Data Units (PPDUs) across multiple bands, also referred to as channels, because the current MAPC coordination function does not support cross-band coordination. Non-Simultaneous Transmit and Receive (NSTR) communication poses a challenge in situations where a STA is connected to two physical APs operating on different frequency bands (e.g., 5 GHZ and 6 GHZ). Specifically, there is no existing mechanism to coordinate the start and/or end of PPDUs to align across physical APs using the existing MAPC coordination or MLD function.

Coordinating the start and/or end alignment of PPDUs may be performed using the inter-MAPC coordination function described herein that supports cross-band coordination. The MAPC coordination function may allow MAPC Coordinated Group (CG) Leaders to coordinate across bands to assign and/or align time slots for NSTR communication. The MAPC coordination function may enable the use of MAPC and MLD together to achieve higher throughput and lower latency for communicating with a NSTR STA than with either capability alone.

FIG. 1 is a block diagram of an operating environment 100 for MAPC and MLD operation. The operating environment 100 may include a CG controller 102, a first band CG leader 104, a second band CG leader 106, a first AP 110, a second AP 112, and a client 120. The CG controller 102 may control or otherwise communicate with the first band CG leader 104 and the second band CG leader 106. The first band CG leader 104 may control or otherwise facilitate network access via a first band (e.g., 5 Ghz band). The second band CG leader 106 may control or otherwise facilitate network access via a second band (e.g., 6 Ghz band).

The first AP 110 and the second AP 112 may be two separate physical APs operating on shared and/or separate bands. For example, the first AP 110 and the second AP 112 may operate on the first band the first band CG leader 104 controls and on the second band the second band CG leader 106 controls, sharing the first band and the second band. The first AP 110 and the second AP 112 may communicate with the client 120 jointly, using MAPC and MLD operations for example.

The client 120 may be a MLD, capable of linking to or otherwise communicating with the first AP 110 and the second AP 112 simultaneously. The client 120 may also be a NSTR device, unable to simultaneously transmit and receive. For MLD communications with the first AP 110 and the second AP 112, the client 120 may need to receive PPDUs from the first AP 110 and the second AP 112 that have aligned end times. Because the client 120 may be connected to 2 co-channel APs over separate bands, MAPC may need to be used to coordinate how data (e.g., the data transmitted during one or more Transmit Opportunities (TxOps)) is divided between the first band over a first link to the client 120 (e.g., via the first AP 110) and the second band over a second link to the client 120 (e.g., via the second AP 112) and at what time(s) in order to meet the NSTR requirement (e.g., so that the ends of the PPDUs are aligned).

To facilitate MAPC and MLD communications between the first AP 110, the second AP 112, and the client 120, the CG controller 102, the first band CG leader 104, and the second band CG leader 106 the may require a time reference to determine how the first AP 110 and the second AP 112 should communicate with the client 120 so the start and/or end times of the PPDUs used during the transmission to the client 120 are aligned. Thus, the CG controller 102, the first band CG leader 104, and the second band CG leader 106 may use a cross-band MAPC CG controller time reference that allows translation of time in one CG with another CG in any network. The CG controller 102, the first band CG leader 104, and the second band CG leader 106 may use a method of time sync time synchronization described by the IEEE 802.1AS standard, a relative reference such as a Time Synchronization Function (TSF), and/or the like.

The CG controller 102, the first band CG leader 104, and/or the second band CG leader 106 may determine which APs of the network will receive which portions of resource allocation for communicating with clients. For example, to determine how to coordinate the end time of PPDUs the first AP 110 and the second AP 112 send to the client 120, the CG controller 102, the first band CG leader 104, and/or the second band CG leader 106 may evaluate AP properties that may affect the time to send a transmission such as the data rate of the connections between the first AP 110 and the client 120 and the second AP 112 and the client 120, the amount of data to be sent, bandwidth, max duration, start and end time, and/or the like. Thus, the CG controller 102, the first band CG leader 104, and/or the second band CG leader 106 may determine different amounts of time the first AP 110 and the second AP 112 have send based on the AP properties.

In certain embodiments, the first band CG leader 104 and the second band CG leader 106 may communicate directly to determine how the first AP 110 and the second AP 112 should communicate to the client 120. The first band CG leader 104 and the second band CG leader 106 may negotiate the communication to coordinate the transmission end times, including which AP takes which links, which AP sends which data, and/or the like. For the first band CG leader 104 and the second band CG leader 106 to directly communicate to determine the communication process to the client 120, the first AP 110 and the second AP 112 may need to be aware of each other (e.g., receiving beacons from the other AP). When an AP detects beacons from another AP on a different band, the AP may notify the first band CG leader 104 and/or the second band CG leader 106 so the CG leaders may know which APs are capable of jointly communicating with the client 120.

In other embodiments, the first band CG leader 104 and the second band CG leader 106 may send a request to the CG controller 102 to determine how the first AP 110 and the second AP 112 should communicate, the request including AP information about the first AP 110 and the second AP 112 such as the band assignments, the APs the leaders have identified, current connections between the APs capable of jointly communicating with the client 120, and/or the like. The CG controller 102 may perform the determination using the information transmitted by the first band CG leader 104 and the second band CG leader 106. The determination may include determining additional AP connections capable of jointly communicating with the client 120, determining transmissions times for the APs, determining what data which AP should transmit, and/or the like.

Once the CG controller 102 performs the determination, the CG controller 102 may then notify or otherwise instruct the first band CG leader 104 and the second band CG leader 106 how the first AP 110 and the second AP 112 should operate, and the first band CG leader 104 and the second band CG leader 106 can instruct the first AP 110 and the second AP 112 to operate according to the CG controller's 102 determination. The instructions of the operation of the first AP 110 and the second AP 112 may include assigned time slots to the first AP 110 and the second AP 112. The time slots may have the same ending time to ensure proper MLD operation of the client 120.

The CG controller 102 performing the determination may be beneficial in some embodiments because the first band CG leader 104 may only identify APs operating on the first band, and the second band CG leader 106 may only identify APs operating on the second band. Thus, when the first band CG leader 104 and the second band CG leader 106 communicate for performing MAPC and MLD operations, the first band CG leader 104 and the second band CG leader 106 may not be aware of all possible AP combinations for communicating with the client 120. The CG controller 102 may receive information of all available APs, so the CG controller 102 may determine the best combination of APs for communicating with the client 120.

The first band CG leader 104 and the second band CG leader 106 may submit bids for TxOps across bands. The first band CG leader 104 and the second band CG leader 106 may submit bids for one or more of the links to the client 120. To submit bids, the first band CG leader 104 and the second band CG leader 106 may provide Key Performance Indicators (KPIs) such as channel bandwidth, max TxOp duration, TxOp start and end time, data rate, and/or the like to the CG controller 102 so the CG controller 102 can evaluate the bids. The CG controller 102 may evaluate the bids and determine an arrangement for the communications with the client 120, such as the first AP 110 sending data to the client 120 via the first band and the first link and the second AP 112 sending data to the client 120 via the second band and the second link.

FIG. 2 is a flow chart of a method 200 for MAPC and MLD operation. The method 200 may begin at starting block 205 and proceed to operation 210. In operation 210, it may be determined to communicate with a client using MAPC and MLD operation. For example, a the client 120 may send a request for data, connect to the network, and/or perform another operation for connecting and/or accessing the network. In response, first band CG leader 104, the second band CG leader 106, the first AP 110, and/or the second AP 112 may determine that the client 120 should be communicated with.

In operation 220, a first AP and a second AP are determined to communicate with the client. For example, the CG controller 102, the first band CG leader 104, and/or the second band CG leader 106 may determine that the first AP 110 and the second AP 112 should communicate with the client 120. The CG controller 102, the first band CG leader 104, and/or the second band CG leader 106 may select the first AP 110 and the second AP 112 according to the operations described above. For example, the first band CG leader 104 and the second band CG leader 106 may communicate directly to select the first AP 110 and the second AP 112 (e.g., based on AP information, the first AP 110 and the second AP 112 exchanging beacons, etc.). The first band CG leader 104 and the second band CG leader 106 may also request or otherwise allow the CG controller 102 to select the first AP 110 and the second AP 112 by sending the AP information to the CG controller 102. The CG controller 102, the first band CG leader 104, and/or the second band CG leader 106 may determine the first AP 110 and the second AP 112 because the first AP 110 is operating on the first band with the first link to the client 120 and the second AP 112 is operating on the second band with the second link to the client 120.

In operation 230, the first AP and the second AP may be coordinated to send one or more PPDUs with synchronized end times. For example, the CG controller 102, the first band CG leader 104, and/or the second band CG leader 106 coordinate the first AP 110 and the second AP 112 to transmit data and align the PPDU end times the first AP 110 and the second AP 112 transmit to carry the data. The CG controller 102, the first band CG leader 104, and/or the second band CG leader 106 may coordinate the APs according to the processes described above. For example, the coordination may be based on AP properties such as data rate, bandwidth, and/or the like. The coordination may include determining how to apportion data for transmission between the first AP 110 and the second AP 112.

In operation 240, the first AP and the second AP may be instructed to communicate with the client according to the coordination. For example, the first band CG leader 104 and the second band CG leader 106 may instruct the first AP 110 and the second AP 112 to communicate with the client 120 according to the coordination determined in operation 230. The first AP 110 and the second AP 112 may then jointly communicate with the client 120 according to the coordination so the end times of the PPDUs the APs transmit are synchronized. Method 200 may conclude at ending block 250.

FIG. 3 is a block diagram of a computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for MAPC and MLD operation and, specifically, MAPC for NSTR cross-band PPDU alignment with respect to FIG. 1 and FIG. 2. Computing device 300, for example, may provide an operating environment for the CG controller 102, the first band CG leader 104, the second band CG leader 106, the first AP 110, the second AP 112, the client 120, and the like. The CG controller 102, the first band CG leader 104, the second band CG leader 106, the first AP 110, the second AP 112, the client 120, and the like may operate in other environments and are not limited to computing device 300.

Computing device 300 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples, and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:

determining to communicate with a client using Multi-Access Point (AP) Coordination (MAPC) and Multi-Link-Device (MLD) operation;

determining a first AP operating on a first band with a first link to the client and a second AP operating on second band with a second link to the client to communicate with the client;

coordinating the first AP and the second AP to send one or more Physical Layer Protocol Data Units (PPDUs) with synchronized end times; and instructing the first AP to transmit to the client via the first link and the second AP to transmit to the client via the second link according to the coordination wherein determining to communicate with the client, determining the first AP and the second AP and coordinating the first AP and the second AP is by a first band Coordinated Group (CG) leader and a second band CG leader.

2. The method of claim 1, further comprising:

receiving, by the first band CG leader and the second band CG leader, notification that the first AP received a beacon from the second AP, wherein determining the first AP and the second AP is based on receiving notification that the first AP received the beacon from the second AP.

3. The method of claim 1, wherein determining to communicate with the client, determining the first AP and the second AP, and coordinating the first AP and the second AP is by a CG controller.

4. The method of claim 3, further comprising:

receiving, by the CG controller, a request to determine how the first AP and the second AP should communicate, the request including AP information.

5. The method of claim 3, further comprising:

receiving, by the CG controller, a first bid from a first band CG leader and a second bid from a second band CG leader, wherein determining the first AP and the second AP and coordinating the first AP and the second AP is based on the first bid and the second bid.

6. The method of claim 1, wherein coordinating the first AP and the second AP is based on a time reference.

7. The method of claim 1, wherein coordinating the first AP and the second AP comprises determining how to apportion data for transmission between the first AP and the second AP.

8. A system comprising:

a memory storage; and a processing unit coupled to the memory storage, wherein the processing unit is operative to:

determine to communicate with a client using Multi-Access Point (AP) Coordination (MAPC) and Multi-Link-Device (MLD) operation;

determine a first AP operating on a first band with a first link to the client and a second AP operating on second band with a second link to the client to communicate with the client;

coordinate the first AP and the second AP to send one or more Physical Layer Protocol Data Units (PPDUs) with synchronized end times;

instruct the first AP to transmit to the client via the first link and the second AP to transmit to the client via the second link according to the coordination; and receive a first bid from a first band CG leader and a second bid from a second band CG leader, wherein to determine the first AP and the second AP and coordinate the first AP and the second AP is based on the first bid and the second bid.

9. The system of claim 8, the processing unit being further operative to:

receive notification that the first AP received a beacon from the second AP, wherein to determine the first AP and the second AP is based on receiving notification that the first AP received the beacon from the second AP.

10. The system of claim 8, the processing unit being further operative to:

receive a request to determine how the first AP and the second AP should communicate, the request including AP information, wherein to determine the first AP and the second AP and to coordinate the first AP and the second AP is based on the AP information.

11. The system of claim 8, wherein to coordinate the first AP and the second AP is based on a time reference.

12. The system of claim 8, wherein to coordinate the first AP and the second AP comprises to determine how to apportion data for transmission between the first AP and the second AP.

13. A non-transitory computer-readable medium that stores a set of instructions which when executed perform a method executed by the set of instructions comprising:

determining to communicate with a client using Multi-Access Point (AP) Coordination (MAPC) and Multi-Link-Device (MLD) operation;

determining a first AP operating on a first band with a first link to the client and a second AP operating on second band with a second link to the client to communicate with the client;

coordinating the first AP and the second AP to send one or more Physical Layer Protocol Data Units (PPDUs) with synchronized end times;

instructing the first AP to transmit to the client via the first link and the second AP to transmit to the client via the second link according to the coordination;

receiving a first bid from a first band CG leader and a second bid from a second band CG leader, wherein determining the first AP and the second AP and coordinating the first AP and the second AP is based on the first bid and the second bid.

14. The non-transitory computer-readable medium of claim 13, the method executed by the set of instructions further comprising:

receiving notification that the first AP received a beacon from the second AP, wherein determining the first AP and the second AP is based on receiving notification that the first AP received the beacon from the second AP.

15. The non-transitory computer-readable medium of claim 13, the method executed by the set of instructions further comprising:

receiving a request to determine how the first AP and the second AP should communicate, the request including AP information, wherein determining the first AP and the second AP and coordinating the first AP and the second AP is based on the AP information.

16. The non-transitory computer-readable medium of claim 13, wherein coordinating the first AP and the second AP is based on a time reference.

17. The non-transitory computer-readable medium of claim 13, wherein coordinating the first AP and the second AP comprises determining how to apportion data for transmission between the first AP and the second AP.

* * * * *